Oct. 20, 1970 — H. J. SCHWERDHOFER — 3,534,630
DRIVE ARRANGEMENT FOR AN ELECTRICALLY OPERATED MOTORCAR WINDOW OR SUNROOF
Filed Aug. 2, 1968

INVENTOR
Hans Joachim Schwerdhöfer
By Low and Berman

Oct. 20, 1970    H. J. SCHWERDHOFER    3,534,630
DRIVE ARRANGEMENT FOR AN ELECTRICALLY
OPERATED MOTORCAR WINDOW OR SUNROOF
Filed Aug. 2, 1968    3 Sheets-Sheet 2

INVENTOR
Hans Joachim Schwerdhöfer

Oct. 20, 1970  H. J. SCHWERDHOFER  3,534,630
DRIVE ARRANGEMENT FOR AN ELECTRICALLY
OPERATED MOTORCAR WINDOW OR SUNROOF

Filed Aug. 2, 1968  3 Sheets-Sheet 3

INVENTOR
Hans Joachim Schwerdhöfer
By: Low and Berman
Agents

United States Patent Office 3,534,630
Patented Oct. 20, 1970

3,534,630
DRIVE ARRANGEMENT FOR AN ELECTRICALLY OPERATED MOTORCAR WINDOW OR SUNROOF
Hans Joachim Schwerdhofer, Schweinfurt (Main), Germany, assignor to Fichtel & Sachs A.G., Schweinfurt, Germany
Filed Aug. 2, 1968, Ser. No. 749,830
Claims priority, application Germany, Aug. 16, 1967, 1,630,492
Int. Cl. F16h 55/02
U.S. Cl. 74—625         10 Claims

ABSTRACT OF THE DISCLOSURE

The operating member of a motor car window or sunroof is normally driven by an electric motor through a speed reducing transmission including an overload clutch. The output member of the transmission may also be operated manually through a second overload clutch. Many variations of the transmission are disclosed.

BACKGROUND OF THE INVENTION

This invention relates to drive arrangements, and particularly to improvements in a drive arrangement for an electrically operated motorcar window or sunroof.

The known drive arrangement which is to be improved by the instant invention includes an electric motor, an elongated operating member, and a speed reducing transmission interposed between the motor and the operating member for moving the latter longitudinally thereof when the motor is energized. The transmission comprises a rotatable input member connected to the motor for rotation thereby, a rotatable output member, means which connect the output member to the operating member for converting rotary movement of the output member into translatory movement of the operating member, and a torque-overload-releasing clutch arrangement, driven and driving portions of the clutch arrangement being in driving connection with the input and output members respectively. A manually operable auxiliary input is provided for rotating the output member if the electric motor drive should fail.

The torque of the manually operated input member is directly transmitted in the known arrangement to the operating member such as a cable guided in such a manner that it can transmit compressive stresses. If the window or sunroof operated by the cable should be stuck because of the presence of a foreign body or otherwise, serious damage to the cable or to other elements of the mechanism can result from excessive forces applied by the auxiliary input.

An object of the instant invention is an improvement in the known drive arrangement which makes the arrangement practically foolproof in preventing damage to the mechanism by force applied in excess while the operated window or sunroof cannot be moved.

SUMMARY OF THE INVENTION

According to a basic feature of this invention, the auxiliary input is connected to the clutch arrangement in such a manner that torque is transmitted from the auxiliary input to the output member through the torque-overload-relasing clutch arrangement. In addition to a first clutch connecting the input and output members, I may provide a second torque-overloading-releasing clutch or slipping clutch operatively interposed between the auxiliary input and the rotatable output member of the transmission. The force transmitted to the operating member may thus be limited to a safe maximum value both for electric motor drive and for manual operation, and damage to the operating mechanism or other parts of the motorcar by excessive force manually applied to the window or sunroof drive can be avoided.

Other features, additional objects and many of the attendant advantages of this invention will be readily appreciated as the same becomes better understood by reference to the following detailed description of preferred embodiments, when considered in connection with the appended drawing.

DESCRIPTION OF THE PREFERRED EMBODIMENTS

Figure 1:
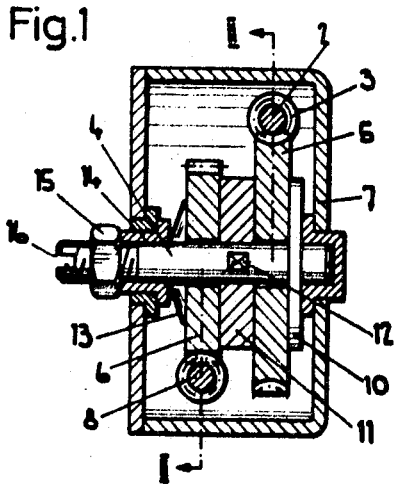
FIG. 1 shows a drive arrangement of the invention in section through the axis of its auxiliary input shaft.
Figure 2:
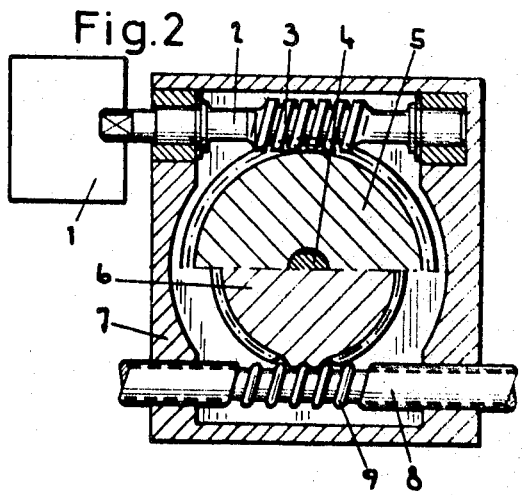
FIG. 2 illustrates the drive arrangement of FIG. 1 in section on the line II—II.

Referring initially to FIGS. 1 and 2, there is seen an electric motor 1 in driving engagement with the input shaft 2 of a speed reducing transmission. The shaft is journaled in the transmission housing 7 and carries a worm 3 which meshes with a worm gear 5 rotatably mounted in the housing 7 on a shaft 4. The shaft also carries a loose output pinion 6 engaging a rack formed on an end portion of a cable 8 by helical wire turns 9. The cable 8 is longitudinally movable in the housing 7. Its other end, not seen in the drawing, is attached to the operating mechanism of a car window or sunroof in a manner known in itself.

Axial movement of the worm gear 5 on the shaft 4 away from the output pinion 6 is prevented by a fixed flange 10 on the shaft 4. A coupling disc 11 is axially movable on the shaft 4 between the worm gear 5 and the output pinion 6, and is prevented from angular movement on the shaft by conforming engagement with a flat 12 on the shaft.

Respective radial faces of the coupling disc 11 are held in frictional engagement with corresponding radial coupling faces of the gear 5 and the pinion 6 by a cup spring 13 which abuts against the other face of the pinion 6 and a flanged bushing 14 on the shaft 4 in the direction of the axis of the shaft 4. The shaft 4 and the bushing 14 project outward of the housing 7. The projecting portion of the shaft is threaded and carries a nut 15 in abutting engagement with the bushing 14. The engaging force exerted by the spring 13 on the pairs of coupling faces on either side of the disc 11 may thus be adjusted by tightening or loosening the nut 15, and by thus axially shifting the shaft 4.

The free end of the shaft 4 outside the housing 7 is slotted along a diameter of the shaft to provide a groove 16 for engagement by a screw driver or other manually operated tool, such as a suitably shaped crank. The free end of the shaft 4 thus provides an auxiliary, manually operable input for the transmission in the housing 7. The shaft 4 normally rotates with the bushing 14 in the housing 7, but is movable in the bushing in an axial direction.

When the motor 1 is energized, torque is transmitted from the input shaft 2 to the worm 3, the worm gear 5, the flange 10 and the coupling disc 11 which are frictionally engaged with the gear 5 to the radial coupling face of the pinion 6.

The maximum moment or torque $M_1$ transmitted by the first torque-overload-releasing clutch mainly constituted by the worm gear 5 and the adjacent faces of the flange 10 and the coupling disc 11 thus has a value of $$M_1 = 2Q \cdot \mu \cdot r_1$$

wherein Q is the circumferentially or tangentially applied force, $\mu$ is the coefficient of friction, and $r_1$ is the effective radius of the frictionally engaged clutch portions, that is, the radius of the coupling disc 11.

The corresponding maximum moment $M_2$ transmitted by the second torque-overload-releasing clutch mainly constituted by the pinion 6, the cup spring 13 and the face of the disc 11 adjacent the pinion 6 is $$M_2 = Q \cdot \mu \cdot (r_1 + r_2)$$

wherein Q, $\mu$, and $r_1$ are as in the preceding formula, and $r_2$ is the smaller radius of the cup spring 13, which is substantially smaller than the radius of the disc 11.

It is evident from the two formulas that an overload applied to the transmission by the electric motor 1 results in slipping of the transmission at the pinion 6, $M_2$ being smaller than $M_1$.

When the shaft 4 is turned manually, the worm gear 5 is held stationary by frictional engagement with the worm 3, the manually applied torque is transmitted to the pinion 6 by the coupling disc 11, and the rotation of the output pinion 6 is converted into translatory movement of the cable 8 by the rack 9. The necessary torque for operating the window or sunroof must overcome the friction in the first clutch at the worm gear 5. The manual input is disengaged from the pinion 6 when the applied torque M exceeds $M_1 + M_2$.

Figure 3:
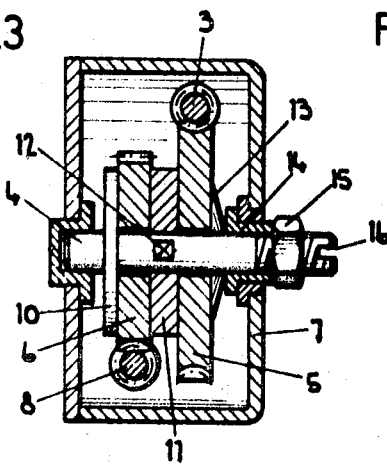
FIGS. 3 to 17 are respective corresponding views of modifications of the drive arrangement of FIG. 1.
Figure 4:
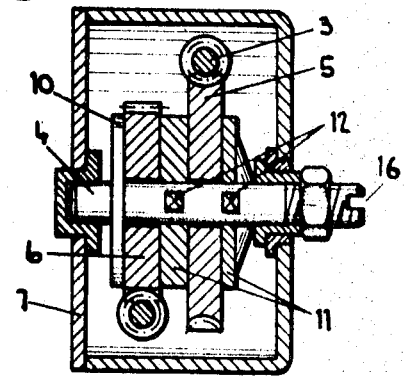
Figure 5:
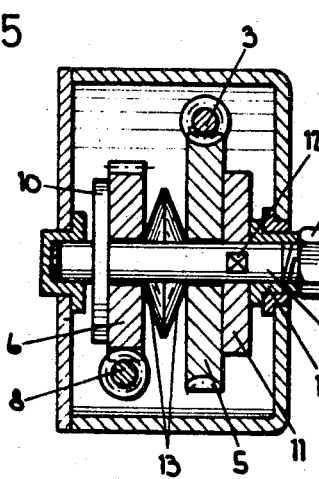

The modifications of the apparatus of FIGS. 1 and 2 which are illustrated in FIGS. 3 to 5 employ the same elements in different arrangements to prevent excessive torque to be converted into compressive stress applied to the cable 8.

In the arrangement shown in FIG. 3, the positions of the clutch supporting input shaft 4, the spring 13 and of the elements which connect the shaft to the spring are inverted so that the flange 10 engages the pinion 6, and the cup spring 13 frictionally engages the face of the worm gear 5 directed away from the coupling disc 11. The bushing 14 and the nut 15 permit the biasing force of the spring to be adjusted as described above.

In the modified drive arrangement shown in FIG. 4, the device of FIG. 3 is provided with a flange 11' axially interposed on the shaft 4 between the cup spring and the worm gear 5. The flange 11' is axially movable on the shaft 4, but is angularly secured on the shaft by conforming engagement with a flat 12.

The drive arrangement illistrated in FIG. 5 is equipped with two cup springs 13 whose wide rims abut against each other while the narrow rims respectively engage the pinion 6 and the worm gear 5. The coupling disc 11 is axially interposed between the worm gear 5 and the bushing 14, while the flange 10 is held against the pinion 6 by the springs 13 with a force which may be adjusted by means of a nut 15 on the bushing 14. The position of the shaft 4 is as in FIG. 3, the groove 16 being in the end of the shaft which is nearer the worm gear 5 than the output pinion 6.

The modified drive arrangements shown in FIGS. 3 to 5 operate generally in the same manner as described with reference to FIGS. 1 and 2, but the ratio of the maximum torques which can be transmitted by the two clutch without slipping under otherwise similar conditions is different in each embodiment described so far, as will be evident without further explanation. A single spring 13 or a single set of springs 13 is common to both clutches in these transmissions, and the maximum torque of one clutch cannot be adjusted without similar adjustment of the other clutch. The ratio of the two maximum torques is not much affected by the adjustment, if the ratio should be affected at all.

The shaft 4 serves as an auxiliary input member while simultaneously supporting the rotatable output pinion 6 and the motion transmitting train, including the two coaxial clutches, which connects the two input elements to the output pinion. The drive arrangements of FIGS. 1 to 5 are distinguished by structural simplicity and corresponding reliability and ruggedness, as well as by low manufacturing cost. In each of these arrangements, the force manually applied to the auxiliary input is in part absorbed by the frictionally engaged slipping elements of the first clutch.

Figure 6:
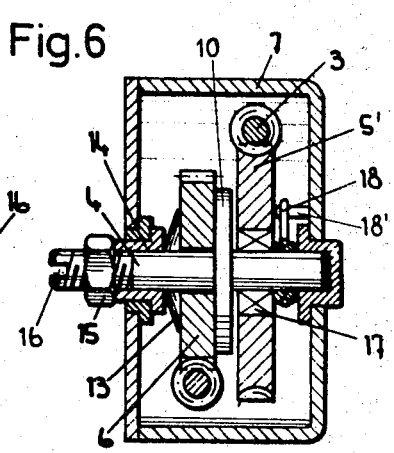

The arrangement shown in FIG. 6 is somewhat similar to that described with reference to FIGS. 1 and 2, but its auxiliary input is operated more easily.

The shaft 4 carries, in axial sequence, the nut 15, the bushing 14, the cup spring 13, the output pinion 6, the fixed flange 10, and a worm gear 5'. An overrunning double-acting clutch 17, known in itself, is radially and operatively interposed between the shaft 4 and the gear 5' which engages the worm 3 as described above. The clutch is controlled by a friction spring 18 normally loosely coiled about a clutch portion which axially projects beyond the gear 5'. One end of the spring 18 extends radially outward from the projecting portion of the overrunning clutch 17 and is attached to a pin 18' projecting from the housing 7.

When the shaft 4 is driven while the gear 5 stands still, as during manual operation, it rotates freely forward or backward in the gear 5'. When the gear 5' is driven by the worm 3 forward or backward, torque is transmitted by the clutch 17 to the shaft 4, the clutch between the pinion 6 and the shaft 4 being released when the transmitted torque exceeds a safe limit. The necessary change in the arrangement of operating parts in the clutch upon reversal of the direction of rotation is brought about by the spring 18 which loosely rides on the clutch during forward rotation, but tightens about the clutch during backward rotation and thus turns the frictionally engaged clutch portion relative to other elements in the clutch, as is conventional.

The torque manually applied to the shaft 4 is thus entirely transmitted to the output pinion 6 as long as the torque does not exceed the limit set by the tension of the spring 13. The adjustment of the spring 13 changes the maximum torque capable of being transmitted by the clutch of the last described embodiment of the invention.

Figure 7:
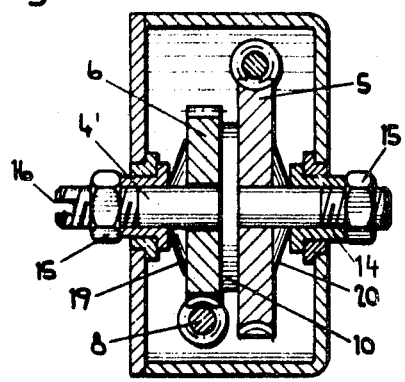

Individual adjustment of each clutch spring while keeping the biasing force of the other clutch spring substantially unchanged is possible in the modified transmission shown in FIG. 7. Both ends of its clutch supporting shaft 4' project from the housing 7 through respective bushings 14 and threadedly carry adjusting nuts 15. The fixed flange 10 replaces the coupling disc 11 on the shaft 4 between the worm gear 5 and the pinion 6 to perform the function of the disc. Two cup springs 19, 20 are interposed between the pinion 6 and the other bushing 14 respectively. The two clutches respectively connecting the shaft 4 to the gear 5 and the pinion 6 may thus be adjusted individually for maximum transmitted torque by turning the two nuts 15.

The shaft 4' is provided with a slot 16 in one of its ends, for engagement with a suitable tool during manual operation of the drive arrangement. If the friction between the metallic elements 6, 10, 5 should not be adequate for transmitting the necessary drive torque, friction facings or axially movable discs of friction material may be interposed between axially opposite metal faces in a conventional manner, not shown.

FIGS. 8 to 17 illustrate modified drive arrangements of the invention in which the auxiliary input is provided by an element other than the common supporting shaft for the driven and driving members of two torque-overload-releasing clutches, and the maximum torque capable of being transmitted by each clutch without slipping can be adjusted only with simultaneous adjustment of the other clutch, the ratio of the two limiting torques being substantially constant. The adjusting elements are mounted on the common supporting shaft.

Figure 8:
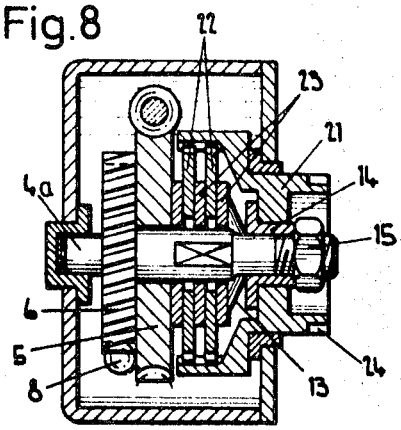

Referring to FIG. 8, there is seen a shaft 4a, one end of which is journaled in the housing 7 and integral with the output pinion 6 of the transmission. A flanged bushing on the other end of the shaft 4a and a nut 15 cooperate as described above to permit axial shifting of the shaft. The bushing is rotatably mounted in an internal flange of a tubular input shaft 21 of stepped cylindrical shape, the portion of the shaft 21 in the housing 7 being radially wider than the portion which projects from the housing and is provided with circumferentially distributed axial grooves 24 for engagement with a manually operated tool, such as a crank or a conforming wrench.

The worm gear 5 of the drive arrangement shown in FIG. 8 is freely movable on the shaft 4a axially adjacent the fixed pinion 6. A multiple-disc clutch connects the enlarged portion of the input shaft 21 with the shaft 4a. Two discs 22 of the clutch are secured by internal splines in the shaft 21, and three discs 23 interleaved with the discs 22 are secured on the shaft 4a by flats on the latter so that the discs 22, 23 may move axially between the worm gear 5 and a cup spring 13 which abuts against the bushing 14.

The several frictionally engageable pairs of radial faces on the pinion 6, on the gear 5, on the discs 22, 23 and on the spring 13 constitute torque-overload-releasing clutches when urged toward each other by the force of the spring 13 which may be adjusted by means of the nut 15. The several clutches cooperate to transmit torgue from the worm gear 5 to the pinion 6, by frictional engagement of the pinion 6 and the gear 5 and by friction between the gear 5 and the axially adjacent disc 22.

The maximum torque or moment that can be transmitted by the illustrated drive arrangement is $M=4Q \cdot \mu \cdot r_1$ because of the provision of two discs on the shaft 21. When the pinion 6 is turned manually by means of a tool connected to the shaft 21, and the gear 5 is arrested by engagement with the associated worm, the frictional resistance of the clutch between the engaged radial faces of the gear 5 and the adjacent disc 23 must be overcome so that the available manually applied maximum torque is correspondingly reduced. The ratio of maximum manual torque to maximum motor-generated torque may be increased in the apparatus of FIG. 8 by increasing the number of discs in the multiple-disc clutch 22, 23. An additional pair of discs 22, 23 would double the maximum output torque available in manual operation of the apparatus.

Figure 9:
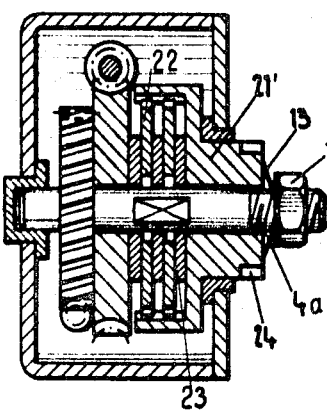

The transmission illustrated in FIG. 9 is closely similar to that described with reference to FIG. 8. The hollow shaft 21' has flat radial faces in the housing 7 and outside the housing. One of the discs engages the inner face, and the cup spring 13 is axially interposed between the outer radial face and the nut 15 on the shaft 4'. A portion of the shaft 21 thus is an active element of the clutch assembly. The shaft 21 also assumes the functions of the bushing 14 in the aforedescribed embodiments of the invention. The shafts 4a and 21 normally rotate jointly.

Figure 10:
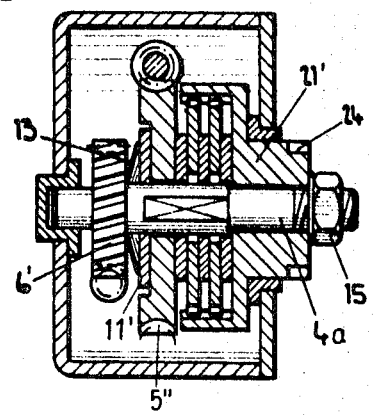

The cup spring 13 may also be interposed axially between an output pinion 6' and a coupling disc 11' in a recess of a worm gear 5" in the transmission shown in FIG. 10 which is otherwise substantially identical with the apparatus of FIG. 9. Because the narrow end of the cup spring abuts against the pinon 6', the pinion can be made smaller in diameter than the opposite radial face of the worm gear 5' without loss of torgue transmitting ability.

Figure 11:
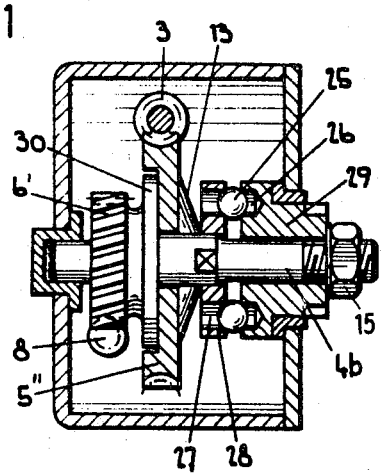

The transmissions shown in FIGS. 8 and 9 may be provided with output pinions maller than those shown if modified in the manner illustrated in FIG. 11 in which the small pinion 6' is integral with a clutch supporting shaft 4b similar to the aforedescribed shaft 4a, and with a fixed flange 30 having a greater diameter than the pinion 6' and frictionally engaging the worm gear 5" in the recess of the latter under the pressure of the spring 13 whose wide end abuts against the other radial face of the gear 5".

The auxiliary input member 29 is a bushing provided with a flange in the transmission housing and coaxially receiving the shaft 4b. A coupling disc 28 is axially movable on the shaft 4b between the spring 13 and the bushing 29, but is prevented from rotating on the shaft. Axial bores 26, 27 in spacedly opposite radial faces of the disc 28 and the bushing 29 are aligned to receive respective portions of steel balls 25 which normally couple the auxiliary input bushing 29 to the shaft 4b and are released from the receiving bores under an excess torque manually applied to the bushing.

Figure 12:
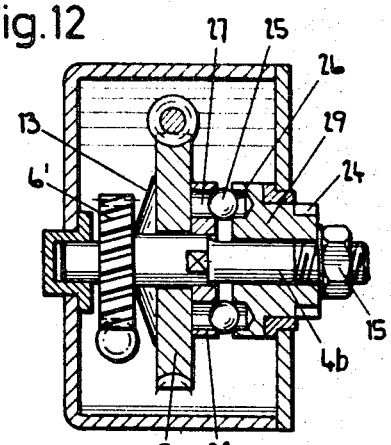

Features of the transmissions shown in FIGS. 10 and 11 are combined in the apparatus of FIG. 12. The cup spring 13 axially connects the small pinion 6' with one radial face of a worm gear 5 of the type shown in FIGS. 1 to 9. The coupling disc 28 frictionally engages the other face of the worm gear 5 and is connected to the auxiliary input bushing 29 by the balls 25 as described with reference to FIG. 11. The disc 28 in the transmission shown in FIG. 12 is thus an element common to both clutches which respectively transmit power from the motor-driven gear 5 and the hand operated input bushing 29 to the output pinion 6'.

When the drive arrangements shown in FIGS. 8 to 12 are operated manually while the electric motor 1 is deenergized, the applied torque must overcome the frictional resistance in the clutch which connects the arrested worm gear to the output pinion. The transmission illustrated in FIG. 13 includes a modification of the apparatus of FIG. 12 which is equally applicable to the devices shown in FIGS. 8 to 11.

Figure 13:
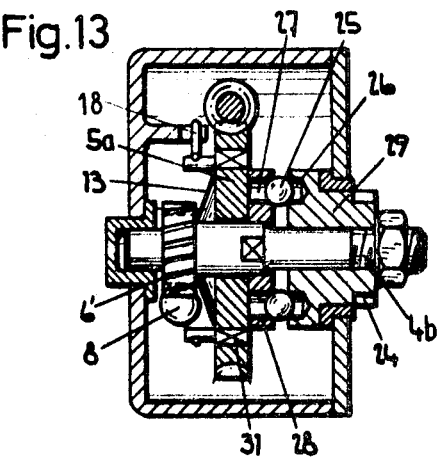

The worm gear 5a seen in FIG. 13 has a central portion axially interposed between the cup spring 13 and the coupling disc 28 as in FIG. 12. The central gear portion is connected with the associated gear rim by an annular, double acting, overrunning clutch 31 controlled by a friction spring 18 as described above. When the transmission is operated manually, the central portion of the gear 5a rotates freely in the toothed rim portion. The transmission is otherwise identical with that shown in FIG. 12.

Figure 14:
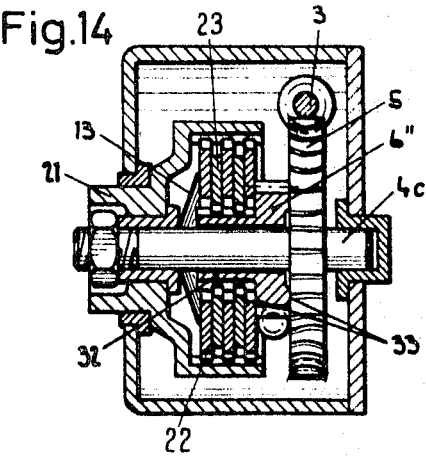
Figure 15:
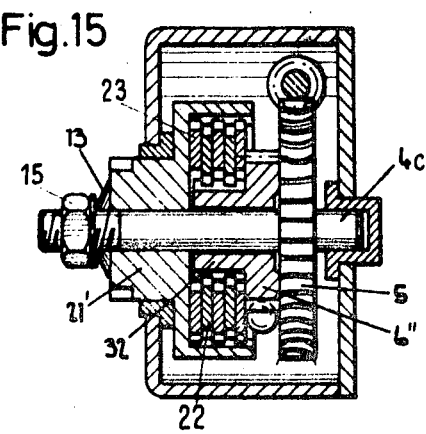
Figure 16:
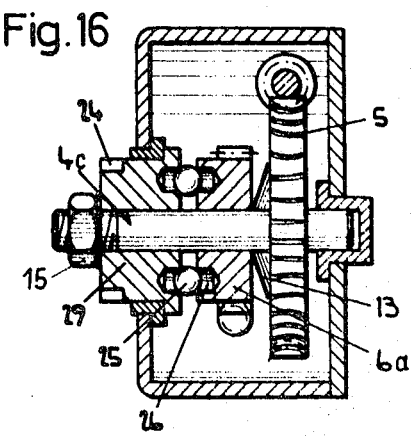

The transmissions illustrated in FIGS. 14 to 17 differ from those described hereinbefore by the provision of a worm gear 5 or 5' normally secured on the clutch shaft 4c against angular and axial movement. In the devices of FIGS. 14 to 16, the gear 5 is integral with the shaft 4c.

As is seen in FIG. 14, the output pinion 6' freely moves on the shaft 4c and has an annular friction face 33 which normally engages a radial face of the gear 5. A tubular hub 32 on the pinion 6" carries the two discs 22 of a multiple-disc clutch whose three outer discs 23 are mounted on a tubular, auxiliary, input shaft 21 substantially as described above with reference to FIG. 8. The two terminal discs 23 of the multiple disc clutch respectively engage the spring 13 and a friction face 33 on the pinion 6".

The device of FIG. 15 differs from that of FIG. 14 as the transmissions of FIGS. 8 and 9 differ from each other: a terminal disc 23 of the multiple-disc clutch engages an inner radial face of the axially input shaft 21', whereas the spring 13 is arranged between the adjusting nut and the outer radial face of the shaft 21'.

The clutch shaft 4c of the transmission shown in FIG. 16 carries, in axial sequence, an adjusting nut 5, an input bushing 29, an output pinion 6a and the worm gear 5, only the gear being fixed on the shaft. Steel balls 25 are the connecting elements of a torque releasing cluch between the input bushing 29 and the pinion 6a, as described above, and a cup spring 13 frictionally transmits torque between the gear 5 and the pinion 6a.

Figure 17:
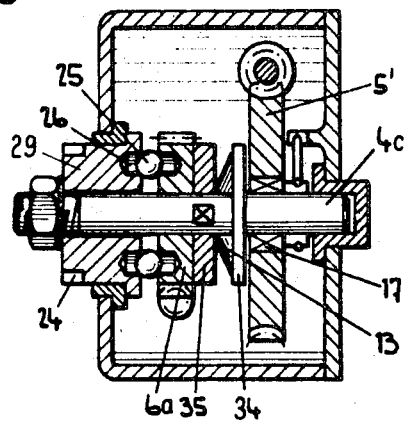

The manual drive portion of the transmission shown in FIG. 17 is identical with the corresponding elements seen in FIG. 16, steel balls 25 being provided between an input bushing 29 and an output pinion 6a, the bushing and pinion being both loosely mounted on a clutch shaft 4c and normally held in engamenment by a cup spring 13.

The spring is axially interposed between a coupling disc 35 axially movable on the shaft 4c, but secured against angular displacement, and a fixed flange 34 on the shaft, and holds respective radial faces of the disc 35 and of the pinion 6a in abutting frictional engagement.

The worm gear 5' is attached to the shaft 4c by a double-acting overrunning clutch 17, as described with reference to FIG. 6, and rotates with the shaft 4c as long as power is transmitted from the gear to the shaft while permitting unhindered rotation of the shaft when the gear stands still.

Numerous further modifications of the drive arrangement of the invention will readily suggest themselves to those skilled in the art in the light of the above teachings. While cup springs are prepared for holding the several clutch elements in engagement and have been shown in all figures of the drawing, helical compression springs and other yieldably resilient elements may be substituted in an obvious manner. Known torque-overload-releasing clutches other than those specifically illustrated may be employed instead of the disc or ball clutches referred to hereinabove.

What is claimed is:

1. In a drive arrangement having a motor, an operating member, and a speed reducing transmission interposed between said motor and said member for moving said member when said motor is energized, the transmission including a rotatable input member connected to said motor for rotation thereby, a rotatable output member connected to said operating member, torque-overload-releasing clutch means for limiting the torque transmitted from said input member to said output member, said clutch means having two portions, one of said portions being driven by said input member and the other portion driving said output member, and manually operable auxiliary input means for rotating said output member, the improvement in the transmission which comprises means connecting said auxiliary input means to said clutch means for transmission of torque from said auxiliary input means to said output member through said clutch means.

2. In a drive arrangement as set forth in claim 1, said clutch means including a first torque-overload-releasing clutch operatively interposed between said input member and said output member and a second torque-overload-releasing clutch operatively interposed between said auxiliary input means and said output member, and connecting means connecting said output member to said operating member for converting rotary movement of said output member into translatory movement of said operating member.

3. In an arrangement as set forth in claim 2, said clutches each comprising a pair of frictionally engageable elements, a spring biasing the elements of said pair toward frictional engagement with each other, and adjusting means for varying the biasing force of said spring while keeping the biasing force of the spring in the other clutch substantially unchanged .

4. In an arrangement as set forth in claim 2, said clutches each comprising a pair of frictionally engageable elements, a spring common to said clutches for biasing the elements of each pair toward frictional engagement with each other, and adjusting means for varying the biasing force of said common spring.

5. In an arrangement as set forth in claim 2, adjusting means for adjusting the releasing torque of each of said clutches, said input menas including an input member, said adjusting means being mounted on said input member.

6. In an arrangement as set forth in claim 2, a shaft having an axis, said clutches each having a driving element and a driven element, said elements of said clutches being coaxially mounted on said shaft, at least one of said elements being secured against rotation on said shaft while being axially movable thereon, another one of said elements being fixedly attached to said shaft, and yieldably resilient means biasing the elements of each clutch toward each other.

7. In an arrangement as set forth in claim 6, said shaft constituting a portion of said auxiliary input means.

8. In an arrangement as set forth in claim 6, said output member being mounted on said shaft for rotation about said axis, a portion of said output member constituting one of said elements.

9. In an arrangement as set forth in claim 6, auxiliary input means inculding an auxiliary input member mounted on said shaft for rotation about said axis, one of said clutches being operatively interposed between said auxiliary input member and said shaft.

10. In an arrangement as set forth in claim 2, an overrunning clutch operatively interposed between said input member and said first torque-overload-releasing clutch.

References Cited
UNITED STATES PATENTS

| | | | |
|---|---|---|---|
| 2,621,543 | 12/1952 | Rossmann | 74—625 |
| 2,771,789 | 11/1956 | Rossmann et al. | 74—625 |
| 3,279,571 | 10/1966 | Wassilieff | 192—38 |

WESLEY S. RATLIFF, Jr., Primary Examiner

U.S. Cl. X.R.

74—89.14